United States Patent [19]

Hayashi et al.

[11] Patent Number: 4,563,983
[45] Date of Patent: Jan. 14, 1986

[54] INTERCOOLER ARRANGEMENT FOR SUPERCHARGED INTERNAL COMBUSTION ENGINE

[75] Inventors: Yoshimasa Hayashi, Kamakura; Yoji Itoh, Tokyo, both of Japan

[73] Assignee: Nissan Motor Co., Ltd., Yokohama, Japan

[21] Appl. No.: 697,924

[22] Filed: Feb. 4, 1985

[30] Foreign Application Priority Data

Feb. 7, 1984 [JP] Japan .................... 59-20498

[51] Int. Cl.[4] ................ F01P 3/22; F02B 29/04
[52] U.S. Cl. ................ 123/41.21; 123/41.27; 123/563; 60/599
[58] Field of Search ............ 123/41.2, 41.21, 41.27, 123/41.31, 563; 60/599

[56] References Cited

U.S. PATENT DOCUMENTS

| | | | |
|---|---|---|---|
| 4,258,550 | 3/1981 | Hinkle et al. | 60/599 |
| 4,317,439 | 3/1982 | Emmerling | 60/599 |
| 4,348,991 | 9/1982 | Stang et al. | 60/599 |

FOREIGN PATENT DOCUMENTS 81716 6/1983 European Pat. Off. ............ 60/599

*Primary Examiner*—William A. Cuchlinski, Jr.
*Attorney, Agent, or Firm*—Schwartz, Jeffery, Schwaab, Mack, Blumenthal & Evans

[57] ABSTRACT

A turbocharger intercooler and engine cooling system are integrated in a manner that the coolant in both arrangements is permitted to boil and the vapor generated condensed in a common radiator. The intercooler is arranged to have liquid coolant pumped into it from the radiator in response to one of the temperature or pressure of the supercharged air exceeding a predetermined level. Excess coolant fed to the intercooler coolant jacket is permitted to overflow via an overflow conduit back to the base of the radiator. The rate at which vapor from both arrangements is condensed is controlled in a manner to raise the pressure within the system and increase the boiling point of the coolant during low load modes such as urban cruising while lower the pressure and boiling point in response to high speed/load engine operation. When the engine is stopped with entire system is filled with liquid coolant in a manner to exclude contaminating atmospheric air.

10 Claims, 9 Drawing Figures

INTERCOOLER ARRANGEMENT FOR SUPERCHARGED INTERNAL COMBUSTION ENGINE

BACKGROUND OF THE INVENTION

1. Field of the Invention

The present invention relates generally to an intercooler for a supercharged internal combustion engine and more specifically to an intercooler which is integrated with the engine cooling system and wherein the coolant in both the engine cooling system and the intercooler, is permitted to boil (viz., absorb its latent heat of vaporization) and the vapor used as a vehicle for removing heat from both arrangements.

2. Description of the Prior Art

In order to improve engine performance superchargers especially exhaust gas driven turbochargers are often fitted to internal combustion engines. However, these devices while improving engine performance have encountered drawbacks in that the temperature of the air charged into the cylinders increases due to compression (often as high as 150°–170° C.) which reduces the density of the air thus reducing charging efficiency, and tends to induce knocking (in Otto cycle engines).

To solve the latter mentioned problem it is common to retard the ignition timing and/or lower the compression ratio. However, this tends to reduce engine power output. Accordingly, it has been proposed to interpose an intercooler between the supercharging compressor and the engine cylinders in order to reduce the temperature of the inducted charge.

FIG. 1 of the drawings shows a first example of a previously proposed intercooler arrangement. This arrangement (disclosed in the Japanese publication "Jidosha Kogaku"—Vol. 32 No. 9 pages 86–88 published in September 1983) employs an air-cooled heat exchanger 101 which is disposed as shown, at the forward end of the vehicle 102 so as to be exposed to an adequate flow of air and at some distance from the engine per se. However, such an arrangement while not excessively increasing the crowding of the engine room or compartment and simultaneously being exposed to a strong natural draft during forward movement of the vehicle, suffers from the drawback that excessively long conduits 104, 106 are required to conduct the air from the compressor of the turbocharger 108 to the heat exchanger 101 and back again to the induction manifold 110 of the engine. These long conduits 104, 106 of course produce a flow restriction which reduces charging efficiency and complicate the layout of the forward end of the engine compartment.

FIG. 2 shows a second prior art intercooler arrangement wherein, in order to obviate the need for long relatively large diameter air conduits such as used in the arrangement disclosed hereinabove, a water cooled heat exchanger 201 is employed. However, this arrangement has suffered from the drawbacks of being heavy (due to the use of a relatively large amount of liquid coolant used therein) and from the need to use a coolant circulation pump 202 to move the heated liquid coolant (usually water or a mixture of water and antifreeze) from the heat exchanger 201 to a cooling radiator 204 and back again. In the illustrated arrangement, the operation of the coolant circulation pump 202 is controlled in response to a temperature responsive valve arrangement 206 disposed in the heat exchanger 201. However, despite this control measure, the parasitic pump 202 consumes an undesirable amount of engine power.

Japanese Patent application first provisional publication No. 56-146417 discloses an arrangement wherein in order to eliminate the need for an additional cost and weight increasing radiator, such as #204 used in the arrangement shown in FIG. 2, a system wherein the engine radiator is used to cool the coolant circulated through the liquid cooled heat exchanger as well as that circulated through the engine coolant jacket. However, with this arangement the coolant circulated to the heat exchanger is hotter than in the case wherein an individual radiator is used, and thus reduces the effectiveness of the intercooler. Viz., with this arrangement as the liquid coolant within the engine cooling system is controlled to approximately 70°–80° C. (by way of example) the temperature difference between the inlet and exhaust ports of the intercooler heat exchanger is small (for example 4° C.) and therefore a large amount of coolant must be circulated therethrough to achieve the desired cooling effect. This of course increases the amount of power consumed by the intercooler coolant circulation pump.

It should be also noted that as the difference between the temperature of the air immediately upstream and that immediately downstream of the aircooled type intercooler is also relatively small efficient heat exchange is severdy inhibited.

FIG. 3 shows another type of previously proposed intercooler arrangement. This arrangement is integrated with the cooling system of the associated engine. In this arrangement coolant from a reservoir 301 is fed to a heat exhanger 302 which forms a vital part of the intercooler 303 and to a pressure pump or compressor 304. The pressurized fluid discharged by the pump 304 is circulated through the engine coolant jacket 305 to absorb the heat produced by the engine. The resulting high pressure-temperature mixture of boiling coolant and vapor is ejected toward a condenser through a variable nozzle jet pump 307. Simultaneously, the liquid coolant fed into the intercooler heat exchanger 302 absorbs heat from the supercharged air passing through the intercooler 303 and vaporizes. This vapor is extracted from the heat exchanger and directed to the condenser 306 under the influence of the venturi action produced by the ejection of the high temperature-pressure liquid/vapor mixture ejected from the variable nozzle jet pump 307. The vaporized coolant is condensed in the condenser 306 and returned to the reservoir 301.

However, this arrangement has encountered several drawbacks in that the compressor 304 consumes valuable engine output, in that it is very difficult to control the temperatures in the system to desired levels with any degree of reliability and in that the liquid coolant fed to the intercooler heat exchanger sometimes becomes excessively heated forming a superheated vapor which lowers the heat exchange efficiency of the intercooler. Further, upon stopping the engine the condensation of the vaporized coolant in the system induces a sub-atmospheric pressure therein which tends to induct contaminating air into the system. The system once contaminated with air tends to lose its efficiency due to the insulating pockets and/bubbles of air which can absorb little or no heat and which are inevitably find their way into the condenser of the system. For further disclosure relating to this device, reference may be had to "MOTOR TREND" published in the U.S. in June 1983 and/or to Japanese Patent Application First Provisional Publication Sho No. 56-146417 (1981).

FIG. 4 shows yet another example of previously proposed intercooler (disclosed in Japanese Patent Application First Provisional Publication Sho No. 57-46016 laid open to public inspection on Mar. 16, 1982). In this arrangement liquid coolant from the engine radiator is admitted under the influence of gravity to a heat exchanging device 409 via a valve 410. This valve is controlled by a level sensor 411 in a manner to maintain an essentially constant level of liquid coolant within the device. The hot supercharged air from the turbo-charger compressor C, passes over and around a plurality of essentially vertically arranged pipes or conduits 412 containing liquid coolant. A vacuum pump or the like 413 driven by an electric motor 414 (or alternatively by way of a mechanical connection with the engine crankshaft) is used to reduce the pressure within the liquid filled portion of the heat exchanger 409 to a level whereat the coolant boils at a suitably low temperature. The coolant vapor extracted from the heat exchanger by the pump 413 is discharged into tthe conduit 415 leading from the engine coolant jacket 416 to the engine radiator 408 and permitted to mix with the liquid coolant and condense at essentially atmospheric pressure.

However, this arrangement has suffered from the drawbacks that the vacuum pump 413 is relatively large and bulky consuming valuable engine room space as well as engine power and in that temperature control with respect to engine operation (e.g. engine load) is not taken into consideration.

SUMMARY OF THE INVENTION

It is an object of the present invention to provided an intercooler arrangement for a supercharged vapor cooled engine which is compact, light and which can be very simply integrated with the "vapor cooled" type engine cooling system.

It is a further object of the present invention to provide an intercooler arrangement of the type mentioned above which synergistically cooperates with the load responsive temperature control of the engine cooling system to improve supercharging characteristics under both high and low engine loads.

In brief, the above mentioned objects are achieved by an arrangement wherein a turbocharger intercooler and engine cooling system are integrated in a manner that the coolant in both arrangements is permitted to boil and the vapor generated, condensed in a common radiator. The intercooler is arranged to have liquid coolant pumped into it from the radiator in response to one of the temperature or pressure of the supercharged air exceeding a predetermined level. Excess coolant fed to the intercooler coolant jacket is permitted to overflow via an overflow conduit back to the base of the radiator. The rate at which vapor from both arrangements is condensed is controlled in a manner to raise the pressure within the system and increase the boiling point of the coolant during low load modes such as "urban cruising" while lower the pressure and boiling point in response to high speed/load engine operation. While the engine is stopped with entire system is filled with liquid coolant in a manner to exclude contaminating atmospheric air.

More specifically, the present invention takes the form of a supercharged internal combustion engine which has: a combustion chamber, compressor, and an induction conduit leading from the compressor to the combustion chamber and through which supercharging air passes from the compressor to the combustion chamber, and which is characterized by a cooling system comprising: a first coolant jacket formed about structure of the engine subject to high heat flux; a radiator in which coolant vapor is condensed to its liquid form; a first vapor transfer conduit leading from the first coolant jacket to the radiator; means for returning liquid coolant from the radiator to thefirst coolant jacket in a manner to maintain the structure subject to high heat flux immersed in liquid coolant and define a vapor collection space within the first coolant jacket; a second coolant jacket arranged in a heat exchange relationship with the induction conduit for cooling the air which passes through the induction conduit; a second vapor transfer conduit leading from the second coolant jacket to the radiator; and a pump which pumps liquid coolant from the radiator to the second coolant jacket in response to a sensor which senses a parameter which varies with the supercharging of the engine.

BRIEF DESCRIPTION OF THE DRAWINGS

The features and advantages of the arrangement of the present invention will become more clearly appreciated from the following description taken in conjunction with the accompanying drawings in which:

FIG. 8 shows in section an example of heat exchanger construction which is used with the embodiment of the invention shown in FIG. 7.

DETAILED DESCRIPTION OF THE PREFERRED EMBODIMENTS

Before proceeding with the description of the actual embodiment of the present invention, it is deemed advantageous to firstly discuss the concepts on which the present invention is based.

Figure 1:
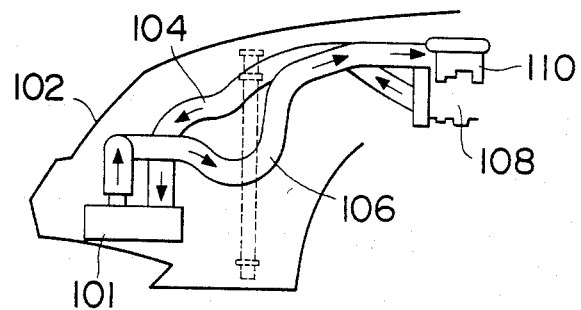
FIGS. 1 to 4 show the prior art intercooler arrangements discussed in the opening paragraphs of the present disclosure.
Figure 2:
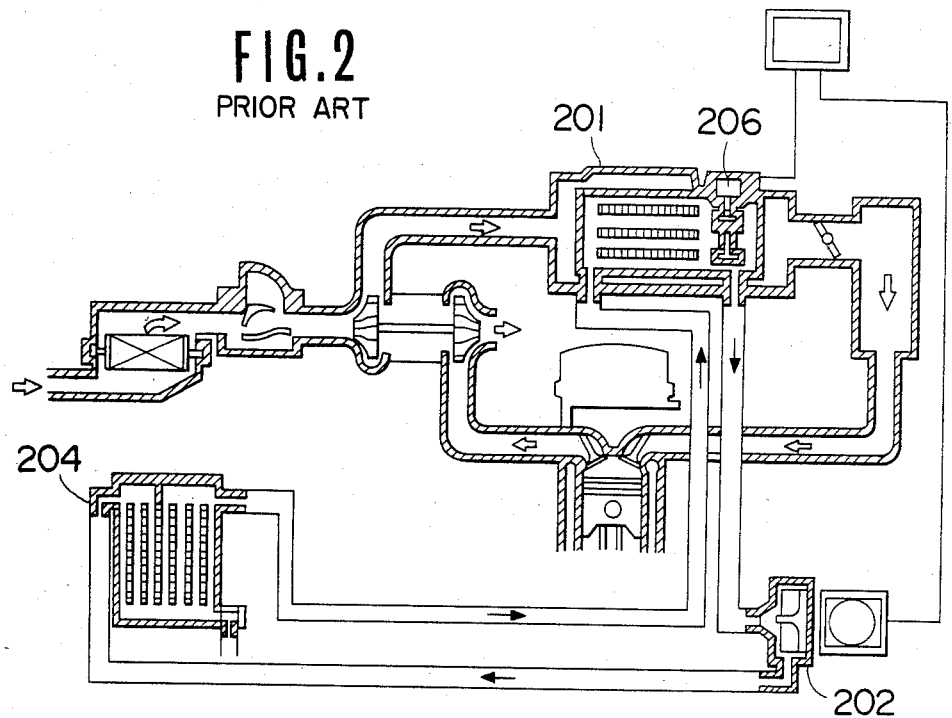
Figure 3:
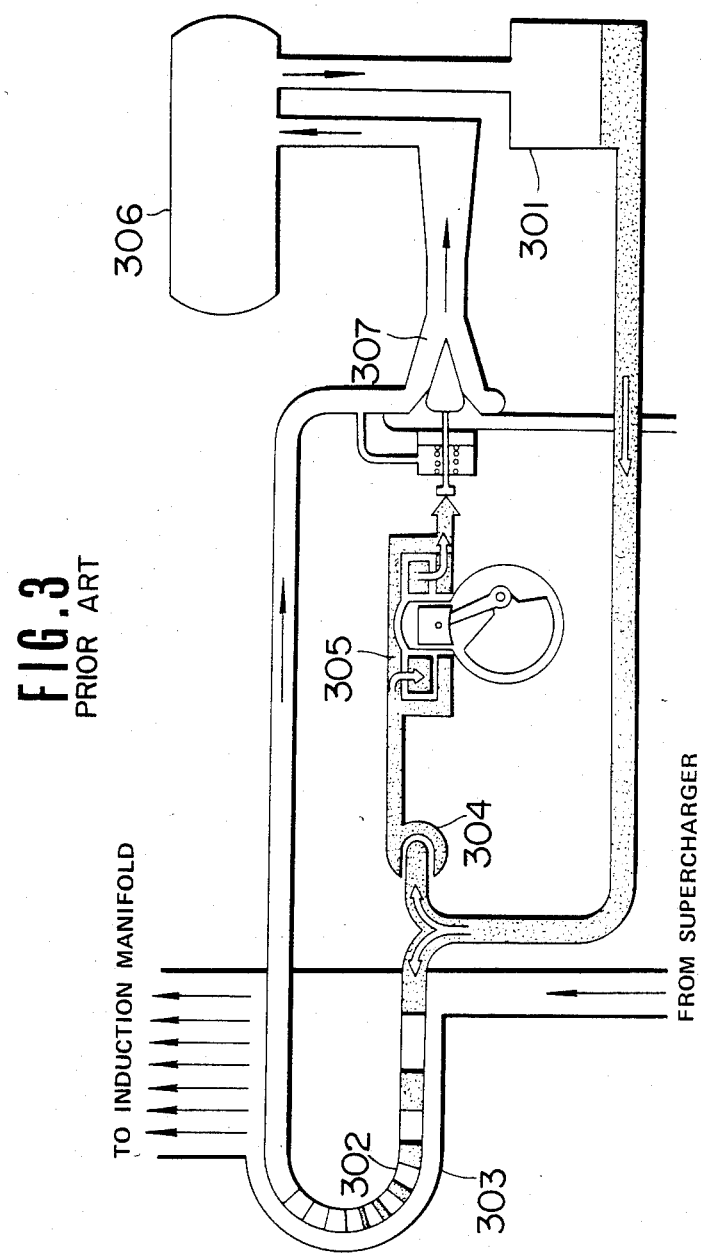
Figure 4:
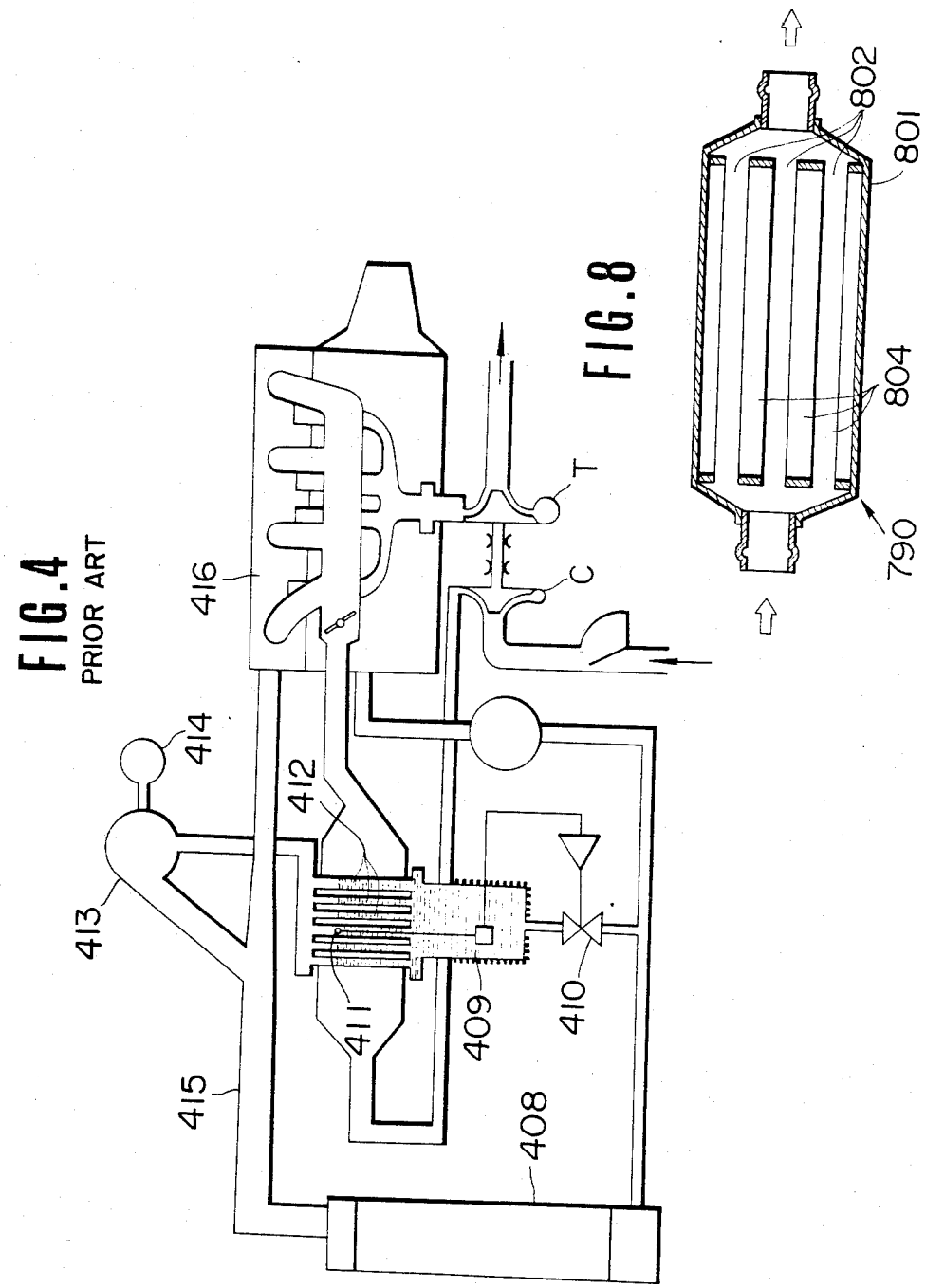
Figure 5:
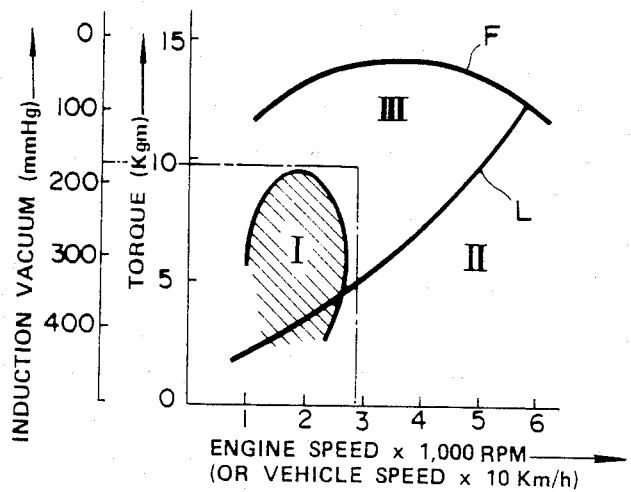
FIG. 5 shows, in terms of engine torque and engine/vehicle speed, the various load zones to which n automotive engine is caused to operate.

FIG. 5 graphically shows, in terms of engine torque and engine speed, the various load "zones" which are encountered by an automotive vehicle engine. In this graph, the the curve F denotes full throttle torque characteristics, trace L denotes the resistance encountered when a vehicle is running on a level surface, and zones I, II and III denote respectively what shall be referred to as "urban cruising", "high speed cruising" and "high load operation" (such as hillclimbing, towing etc.).

A suitable coolant temperature for zone I is in the order of 120° C. (for example) while as low as 90° C. (for example) for zones II and III. If desired it is possible to induce the coolant to boil at approximately 100° C. in zone II if so desired.

The high temperature during "urban cruising" promotes improved thermal efficiency and fuel economy while the lower temperatures promote improved charging efficiency while simultaneously removing sufficient heat from the engine and associated structure to obviate engine knocking and/or possibility of engine damage in the other zones.

Figure 6:
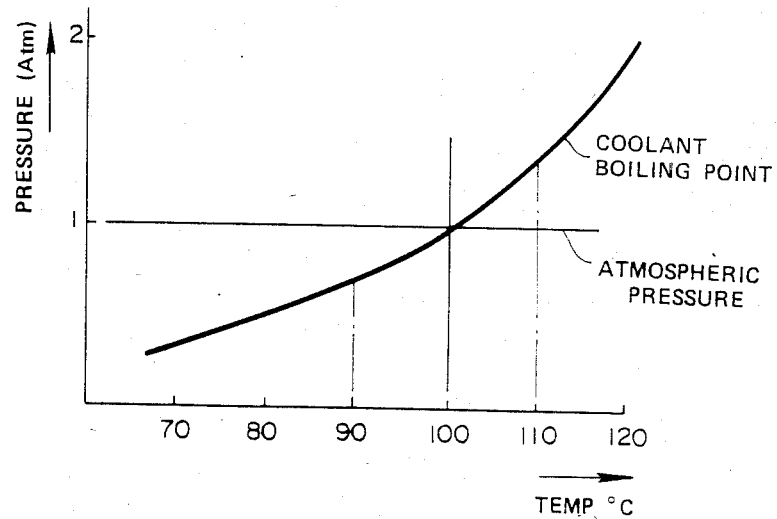
FIG. 6 is a graph showing, in terms of pressure and temperature, the change which occurs in coolant boiling point with change in pressure.

With the present invention, in order to control the temperature of the engine, advantage is taken of the fact that with a cooling system wherein the coolant is boiled and the vapor used a heat transfer medium, boiling is most vigorous in zones of high heat flux, whereby the temperature of engine structure subject to high heat flux is maintained essentially equal to that of structure subject to less intensive heating whereat boiling is less vigorous and less heat removed; the amount of coolant actually circulated between the coolant jacket and the radiator is very small; the amount of heat removed from the engine per unit volume of coolant is very high; and upon boiling, the pressure prevailing within the coolant jacket and consequently the boiling point of the coolant rises if the system employed is closed. Thus, by circulating a controlled amount of cooling air over the radiator, it is possible reduce the rate of condensation therein and cause the pressure within the cooling system to rise above atmospheric and thus induce the situation, as shown in FIG. 6, wherein the engine coolant boils at temperatures above 100° C.—for example at approximately 110° C.

On the other hand, during high speed cruising, it is further possible by increasing the flow of cooling air passing over the radiator (for example by energizing a cooling fan as required to supplement the natural draft of air which occurs under such conditions) to increase the rate of condensation within the radiator to a level which reduces the pressure prevailing in the cooling system below atmospheric and thus induce the situation wherein the coolant boils at temperatures below 100° C.—for example at approximately 90° C.

Figure 7:
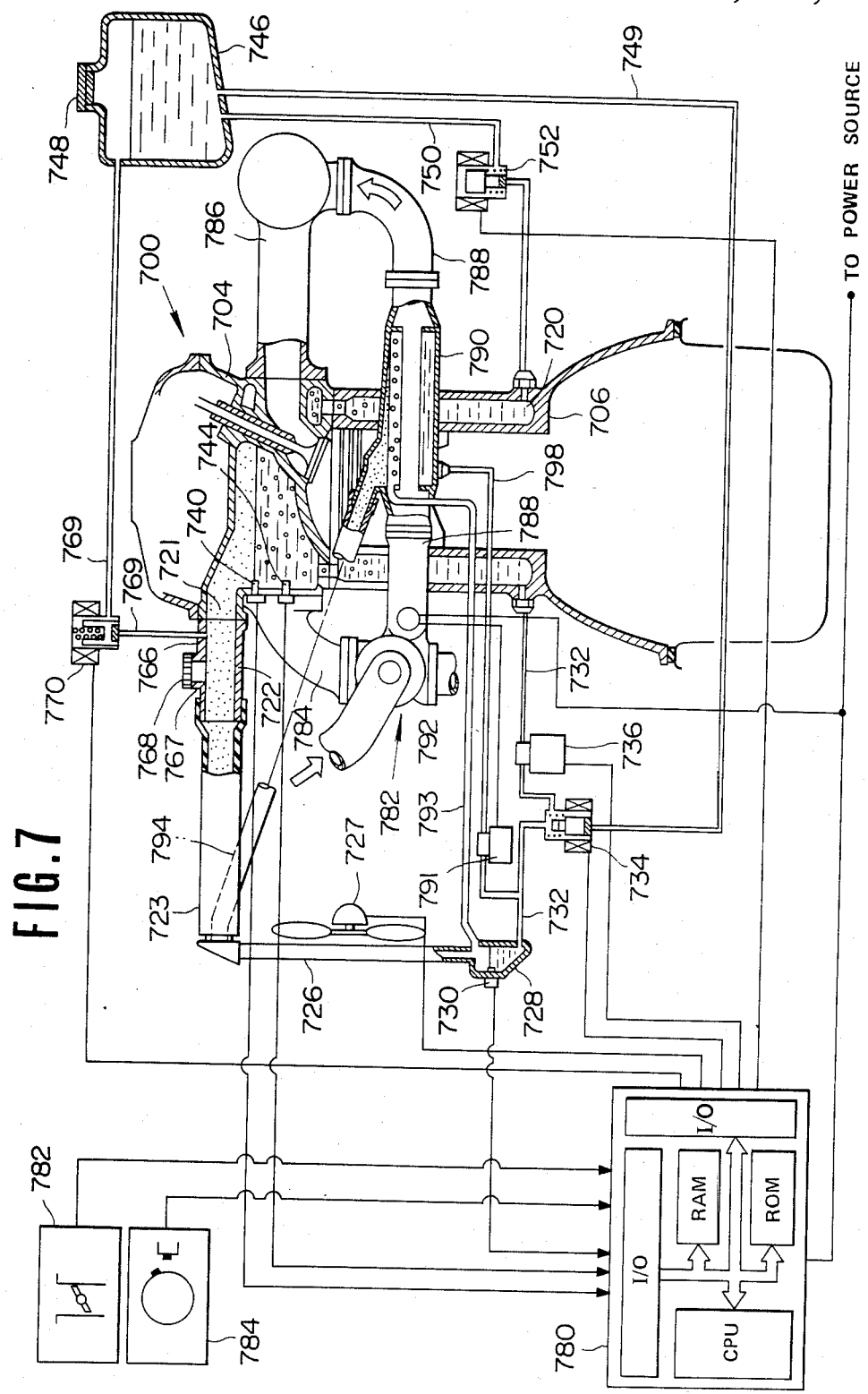
FIG. 7 shows in schematic elevation (partially in section) an embodiment of the present invention.

FIG. 7 shows an engine system incorporating a first embodiment of the present invention. In this arrangement, an internal combustion engine 700 includes a cylinder block 706 on which a cylinder head 704 is detachably secured. The cylinder head 704 and cylinder block 706 include suitable cavities which define a coolant jacket 720 about the heated portions of the cylinder head and block.

Fluidly communicating with a vapor discharge port 724 of the cylinder head 704 via a vapor manifold 722 and vapor transfer conduit 723, is a radiator or heat exchanger 726. It should be noted that the interior of this radiator 726 is maintained essentially empty of liquid coolant during normal engine operation so as to maximize the surface area available for condensing coolant vapor (via heat exchange with the ambient atmosphere) and that the cooling system as a whole (viz., the system encompassed by the coolant jacket, radiator and conduiting interconnecting same) is hermetically closed when the engine is warmed-up and running. These features will become clearer as the description proceeds.

If deemed advantageous a mesh screen or like separator (not shown) can be disposed in the vapor discharge port 721 of the cylinder head so as to minimize the transfer of liquid coolant which tends to froth during boiling, to the radiator 726.

Located suitably adjacent the radiator 726 is a electrically driven fan 727. Defined at the bottom of the radiator 726 is a small collection reservoir or lower tank 728 as it will be referred to hereinafter. Disposed in the lower tank 728 is level sensor 730 which is adapted to output a signal indicative of the level of liquid coolant in the lower tank 728 being lower than a level which is beneath the lower ends of the relatively small diameter tubing which constitute the heat exchanging portion the radiator.

Leading from the lower tank 728 to the cylinder block 720 is a return conduit 732. As shown, a "three-way" type electromagnetic valve 734 and a relatively small capacity return pump 736 are disposed in this conduit. The valve 734 is located upstream of the pump 736. The return conduit 732 is arranged to communicate with the lowermost portion of the coolant jacket 720.

In order to sense the level of coolant in the coolant jacket and appropriately control the operation of the pump 736, a level sensor 740 is disposed as shown. It will be noted that this sensor is arranged at a level higher than that of the combustion chambers, exhaust ports and valves (i.e. structure subject to high heat flux) so as to enable same to be securely immersed in coolant and thus attenuate any engine knocking and the like which might otherwise occur due to the formation of localized zones of abnormally high temperature or "hot spots". It will also be noted that the level sensor 740 is located at a level lower than the upper section or roof of the structure of the cylinder head which defines the coolant jacket therein, so as to define a coolant vapor collection space above the liquid coolant.

Located below the level sensor 740 so as to be immersed in the liquid coolant is a temperature sensor 744.

A coolant reservoir 746 is located beside the engine proper as shown. An air permeable cap 748 is used to close the reservoir 746 in a manner that atmospheric pressure continuously prevails therein.

The reservoir 746 fluidly communicates with the "three-way" valve 734 via a supply conduit 749 and with the engine coolant jacket 720 via a fill/discharge conduit 750 and an ON/OFF type electromagnetic valve 752. The three-way valve 734 is arranged to establish fluid communication between the lower tank 728 and the coolant jacket 720 when de-energized while establish fluid communication between the coolant jacket 720 and the reservoir 746 when energized. Valve 752 is arranged to be closed when energized.

The vapor manifold 722 is formed with a "purge" port 766 and a riser like portion 767 which is hermetically closed by a cap 768. The purge port 766, as shown, communicates with the reservoir 764 via a first overflow conduit 769. A normally closed electromagnetic valve 770 is disposed in the overflow conduit 769. This valve is arranged to be open only when energized.

The above mentioned level sensors 730 & 740 may be of any suitable type such as float/reed switch types.

As shown, the outputs of the level sensors 730 & 740 and temperature sensor 744 are fed to a control circuit 780. In this embodiment the control circuit 780 includes therein a microprocessor including input and output interfaces I/O CPU, a RAM and a ROM. Suitable control programs are set in the ROM and are used to control the operation of the valves 734, 752 & 770, pump 736 and fan 727 in response to the various data supplied thereto.

In order that the temperature of the coolant be appropriately controlled in response to changes in engine load and speed, a load sensor 782 and an engine speed sensor 784 are arranged to supply data signals to control circuit 780. The load sensor may take the form of a throttle position switch which is tiggered upon the engine throttle valve being opened beyond a predetermined degree. Alternatively the output of an air flow meter or an induction vacuum sensor may be used. The engine speed signal may be derived from the engine distributor, a crankshaft rotational speed sensor or the like.

It is within the scope of the present invention to arrange for a look-up table of the nature of that shown in FIG. 5 to be provided in the ROM of the microprocessor, or alternatively programs may be suitably devised to achieve the desired load/engine speed responsive temperature control in response to the inputted data signals. For further disclosure relating to this particular control reference should be had to the documents incorporated by reference hereinlater.

An exhaust gas driven supercharger 782 or turbocharger as it will be referred to hereinafter, is arranged in an exhaust conduit 784 as shown. Leading from the compressor of the turbocharger 782 to the induction manifold 786 of the engine is a conduit 788. This conduit will be referred to as the induction conduit hereinafter.

Disposed in the induction conduit 788 is heat exchanger 790 (the "heat" the intercooler arrangement which characterizes the present invention) through which the hot supercharging air from the compressor passes before reaching the combustion chamber or chambers of the engine. An example of the construction of this heat exchanger is shown in FIG. 8. This arrangement, as shown, includes a housing structure 801 which defines passages 802 through which the hot air may flow and passages 804 into which liquid coolant maybe introduced. As best seen in FIG. 7, the heat exchanger 796 is arranged to communicate with the lower tank 728 via a second supply conduit 798. A small capacity pump 791 is disposed in this supply concuit 798 and arranged to be responsive to a temperature sensor 792 (or alternatively pressure sensor) which is disposed in the induction conduit 788 upstream of the intercooler heat exchanger 790. With this arrangement when the temperature (or pressure) prevailing upstream of the heat exchanger exceeds a predetermined level, the sensor acts as a switch which closes to complete a circuit provided between a power source and the pump 791 whereby the pump is energized to draw liquid coolant from the lower tank 728 and pump same into the heat exchanger. A second overflow conduit 793 leads from a level close to the roof or upper section of the heat exchanger housing 801, back to the lower tank 728. As shown, this second overflow conduit 793 is arranged to communicate with the lower tank 728 at a level which is higher than that of level sensor 730. This ensures unrestricted "spill over" of any excess coolant which is pumped into the heat exchanger housing during normal running operation.

A second vapor transfer conduit is arranged to lead from the heat exchanger housing 801 to the top of the radiator 726. As shown, this conduit 794 is arranged to communicate with the heat exchanger housing 801 at a level which is higher than that at which the overflow conduit 793 communicates with same. This arrangement provides a small vapor collection space within the housing which facilitates boiling of the coolant fed thereinto.

Prior to initial use the cooling system (including the heat exchanger housing passages 804) is completely filled with coolant (for example water or a mixture of water and antifreeze or the like) and the cap 768 securely set in place to seal the system. A suitable quantity of additional coolant is also introduced into the reservoir 746. Although at this time by using de-aerated water when initially filling the system and reservoir, the system is essentially free of contaminating air etc., over a period of time non-condensible matter will find its way into the system. For, example the water (coolant) in the reservoir 746 will tend to absorb atmospheric air and each time the system is filled with coolant (explanation given in detail later) a little non-condensible matter will tend to find its way into the system. Further, during given modes of engine operation, negative pressures develop and although the system is operating in a sealed or closed mode at the time, air, little by little, tends to leak into the system via the gasketing and the like defined between the cylinder head and cylinder block and between the seals defined between conduiting and associated elements of the system.

Accordingly, upon start-up of the engine, given that the engine temperature is below a predetermined value (45° C. for example) a non-condensible matter purge operation is carried out. In this embodiment the purge operation is effected by pumping excess coolant into the system for a predetermined period of time. As the system should be essentially full before the initiation of this operation, the excess coolant thus introduced, positively displaces any air or the like which might have collected. In this embodiment the purge operation is carried out by energizing valve 752, 734 and 770 and energizing the pump for several tens of seconds. More specifically, valve 752 is conditioned to assume a closed condition, valve 770 on open one and valve 734 conditioned to establish communication between the reservoir 746 and the coolant jacket 720. Thus, pump inducts coolant from the reservoir 746 via conduit 749 and forces same into the coolant jacket through conduit 732. The excess coolant thus inroduced accordingly escapes from the top of the system via overflow conduit 769 and is returned to the reservoir. Any air or like noncondensible matter is carried out of the system along with the overflowing coolant.

Upon termination of this mode of operation the system enters a so called "excess coolant displacement mode" wherein the coolant is permitted to heat, produce vapor pressure and displace itself out of the system back to the reservoir via conduit 750. In order to achieve this, only valve 752 is de-energized to assume an open state while valves 770 and 734 are de-energized to respectively assume a closed position and one in which the small collection tank 728 is placed in fluid communication with the coolant jacket 720.

As the coolant is displaced out of the system, the level of liquid coolant falls below that of level sensor 740. Accordingly, pump 736 is energized and coolant is pumped from the radiator 726 into the coolant jacket so as to maintain the level of coolant therein at that of level sensor 740. This action draws coolant out of the intercooler heat exchanger housing 801 via overflow conduit. Accordingly, as coolant is simultaneously being displaced from the system via conduit 750, the radiator and second vapor conduit are emptied of coolant until the situation show in FIG. 7 occurs. At this time level sensor 730 issues a signal indicating that the level of coolant has fallen thereto which termintates the displacement mode and energizes valve 752 to place the system in a "closed" state.

It will be noted that as the system is initially filled with coolant, as the coolant is not circulated as in conventional type circulation systems, very little heat can be removed from the engine whereby the coolant and the engine rapidly warm up and quickly produces the necessary vapor pressure to carry out the above discussed "displacement" mode of operation.

During normal operation the vapor produced in the coolant jacket 720 (and in the heat exchanger 790) is condensed in the radiator. The rate at which the vapor is condensed is controlled in accordance with the engine load and rotational speed.

Simultaneously, the exhaust gases produced in the combustion chamber or chambers are used to rotate the turbine of the turbocharger, rotate the compressor and thus force supercharged air through induction conduit 788. Due to the compression the temperature and pressure of the air rises. As mentioned previously the temperature can rise as high as 170° C. Accordingly, the coolant contained in the heat exchanger 790 is heated to the point of boiling. The temperature at which the coolant boils is dependent on the pressure prevailing within the system. Accordingly, if the engine is operating in a low load zone, the boiling point may be as high as 110° C. Conversely, if the engine is operating in a high load zone the boiling point of the coolant in the heat exchanger 790 may be as low as 90° C.

Assuming for the sake of explantion that the engine is operating under high load/engine speed conditions and the boiling point of the coolant is controlled to 90° C., as the engine speed is high, the rotational speed of the compressor will be accordingly high and the temperature of the supercharged air emitted from the compressor approximately 150° C. (by way for example only). Under these conditions due to the boiling of the coolant (viz., the absorbing of the latent heat of evaporation of the coolant) the heat contained in the air will removed and the temperature thereof lowered to approximately 90° C. This of course represents a notable temperature reduction of approximately 60° C., which induces a highly desirable increase in the charging efficiency of the engine.

On the other hand, if the engine is operating in the so called "urban cruising" mode, the boiling point of the coolant in the heat exchanger will be above 100° C. Under these conditions the temperature of the air discharged from the turbocharger compressor will be lower than in the above described instance. Accordingly, the temperature reduction may amount only to some tens of degrees and the temperature of the air charged into the combustion chambers in the order of 105°–110° C. However, as the amount of heat introduced into the combustion chambers prior combustion is higher than under high load operation, the amount of heat contained in the exhaust gases increases thus increasing the energy available for rotating the turbocharger turbine or impeller. Accordingly, when the engine is accelerated from idling or low RPM, the response of the turbocharger under such conditiions is notably improved. This is combination with the improved thermal efficiency induced by raising the boiling point of the coolant in the coolant jacket results in highly responsive economical engine operation.

With the embodiment shown in FIG. 7 when the temperature of the air discharged from the turbocharger compressor exceeds a given level, pump 791 is energized. With this arrangement it is possible to both permit the coolant to boil as well as circulate a small amount of coolant from the collection tank 728 into the heat exchanger so as to achieve a small overflow. This securely maintains the appropriate level of coolant in the coolant jacket thus assuring adequate cooling of the supercharging air.

When the engine is stopped, due to thermal inertia the coolant will inevitably continue to boil for a short period. This tends to generate a slightly superatmospheric pressure within the system. Accordingly, it is deemed advantageous to allow the coolant temperature to drop to a level whereat a slightly sub-atmospheric pressure prevails before permitting the system to assume an open state. This obviates the tendency of large quantities of coolant be displaced out of the system and ensures that upon the system being placed in an open condition that the coolant stored in the reservoir will be smoothly inducted to fill the system. That is to say, as the vapor condenses the coolant from the reservoir will be inducted in a manner to replace same and hence completely fill the system. This eliminates the tendency for any atmospheric air to seek its way into the system due to the presence of a sub-atmospheric pressure.

If the engine is restarted before the temperature of the coolant has lowered to any notable degree (for example 45° C.), the system immediately undergoes a "warm start" wherein the purge operation is by-passed and the coolant displaced mode directly entered.

Figure 9:
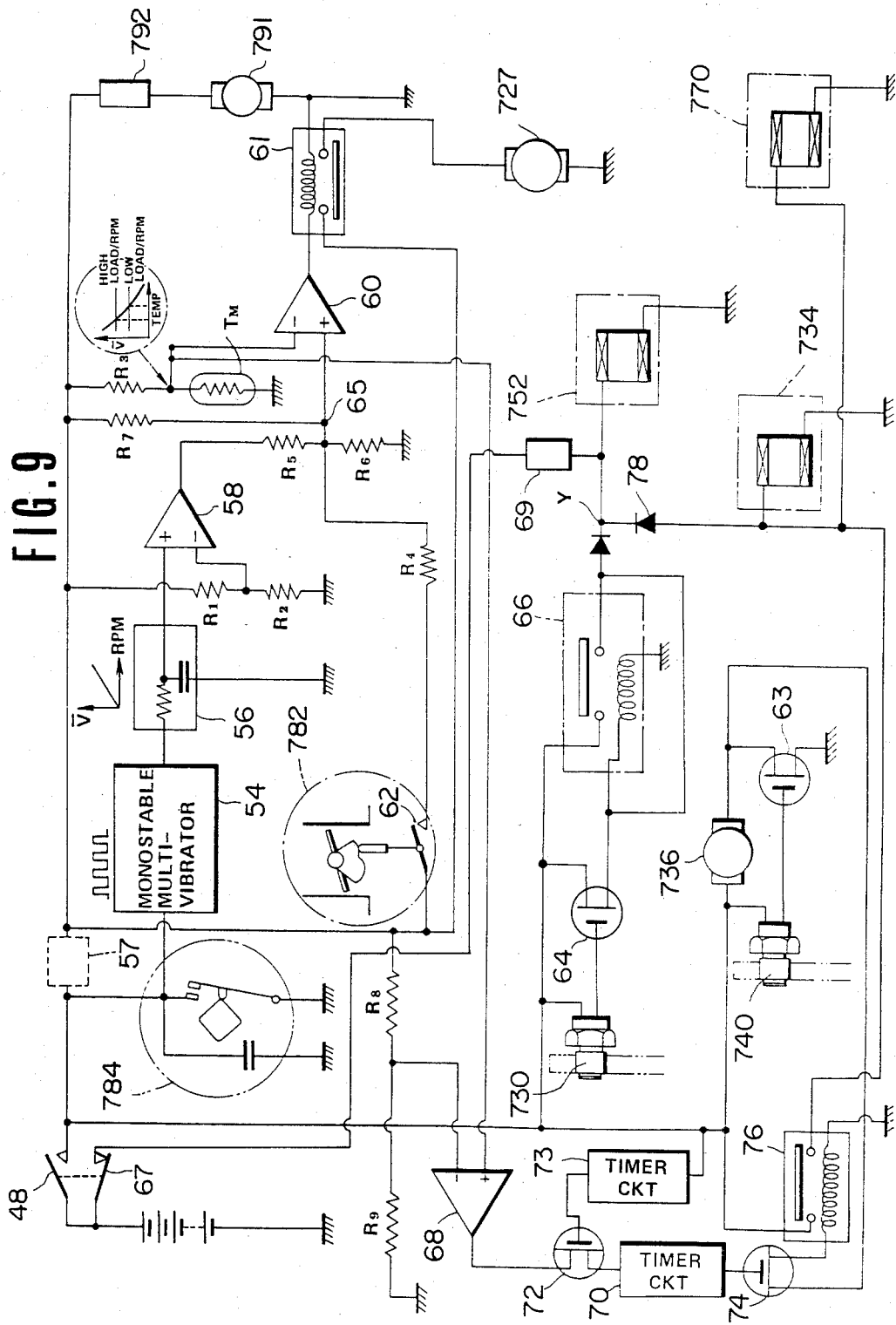
FIG. 9 shows an example of circiutry which can be used to control the various valves and other electrically operated devices employed in the arrangement shown in FIG. 7.

FIG. 9 shows an example of circuitry suitable which can be used for controlling the valves 734, 752 and 770, pump 734 and fan 727 of the embodiment of the present invention shown in FIG. 7, in place of the microprocessor.

In this circuit arrangement the distributor of the engine ignition system is used as the engine rotational speed sensor 784, and is connected, as shown, with an EMF or power source through the engine ignition switch 48. A monostable multivibrator 54 is connected in series between the distributor and a smoothing circuit 56. A DC-DC converter 57 is arranged, as shown in broken line, to ensure a supply of constant voltage. A first voltage divider consisting of resistors R1 and R2 provides a comparator 58 with a reference voltage at its inverting input (−) thereof while the non-inverting input (+) of said comparator receives the output of the smoothing circuit 56. A second voltage dividing arrangement consisting of a resistor R3 and a thermistor $T_M$ (viz., the heart of the temperature sensor 744) applies a variable voltage to a second comparator 60 which also receives a signal from a cam operated throttle switch 62 via a resistor arrangement including resistors R4, R5, R6 and R7, connected as shown. The output of the comparator 60 is applied to the fan 726 via a relay 61 to energize same.

The circuit further includes a transistor 63 which acts a switch upon receiving an output from the level sensor 740 to establish a circuit between the source of EMF and ground. As a safety measure, an inverter or the like (not shown) may be interposed between the level sensor 740 and the transistor 63, and the level sensor adapted to produce an output when immersed in coolant. With this arrangement should the level sensor malfunction, the lack of output therefrom causes the transistor 63 to be continuously rendered conductive and the pump 736 continually energized to ensure that an adequate amount of coolant is maintained in the coolant jacket.

In order to achieve the desired control of valve 752, level sensor 730 is circuited via transistor 64 with a self-energizing relay 66 in a manner that, until the level of the coolant in the collection tank 728 is forced down to the level of the level sensor 730, the relay 66 is not closed and the solenoid of the valve 752 not energized, whereby valve 752 remains open so that the desired amount of coolant contained in the radiator 126 and coolant jacket can be apropriately displaced out to the reservoir 746. Opening of the switch 48 de-energizes the solenoid of the valve 160 and opens the self energizing relay 66. However, to prevent violent discharging of coolant out of the system under the influence of superatmospheric pressure, a switch 67 is arranged to be closed as switch 48 is opened and vice versa. This switch 67 is circuited with the solenoid of the valve 752 via a suitable temperature sensor 69 (e.g. a bimetallic strip type switch) which is set to open upon the coolant temperature falling to a level whereat slightly sub-atmospheric pressures prevail within the coolant jacket 720, radiator 726, etc. This maintains the valve 752 closed for a short period after the engine is stopped and allows for the previously mentioned thermal inertia.

As will be appreciated, with the circuit thus far disclosed, depending on the load and engine speed, the temperature of the coolant in the coolant jacket 120 will be adjusted in a manner that at low engine speeds and loads the voltage appearing at the inverting terminal of the comparator will be compared with the voltage appearing on the non-inverting terminal thereof and the fan 726 suitably engergized to maintain a high temperature under so called "urban cruising" conditions and lowered at high load/speed operation. Further, upon stoppage of the engine, the coolant jacket 720, radiator 726 heat exchanger 790 and conduiting will be completely filled with coolant to exclude the possiblity of air contamination subsequent to a short cool down period.

This circuit further includes a comparator 68 which receives the output of second voltage divider (R3, $T_M$) on its non-inverting terminal (+) and a reference voltage from a voltage divider consisting of resistors R8, R9 on its inverting one (−). The resistances of the resistors R8, R9 are selected to provide a voltage representative of the predetermined temperature (viz., 45° C.).

The output of this comparator 68 is fed to a timer circuit 70 via transistor 72. The base of this transistor 72 is connected with a second timer circuit 73 which is arranged to be triggered to produce a high output for a predetermined period by the closure of switch 48. The time for which the second timer circuit 73 outputs a high level signal should be slightly longer that of timer 70. The output of the timer circuit 70 is fed to the base of a transistor 74 which as shown, serves a switch for energizing relay 76. This relay 76 upon being closed by a currrent passing through the coil thereof (via the pump 736 and the transistor 74), supplies current to the solenoids of valves 734, 752 & 770. So as to selectively induce temporary closure of valve 752 during the purge operation, the relay 76 is connected to the solenoid of valve 752 through a diode 78. To prevent unwanted closure of the relay 66, a second diode 80 is disposed as shown, to prevent current from flowing from terminal Y to ground through the coil of relay 66.

As will be appreciated if the temperature of the coolant as sensed by the thermister Tm is below 45° C. and the timer 73 is ouputting a high level signal, then valves 752, 734 & 770 and the pump 736 will be energized for non-condensible matter purging.

If desired the timer circuit 70 may be omitted.

In this circuit arrangement the temperature sensor 792 is circuited in series with the pump 791 as shown. Upon the predetermined temperature (or pressure) at which the sensor is set to close, being reached, power is permitted to flow from the source of EMF through the motor of the pump 791 to ground.

It should be noted however, that while the just disclosed pump control arrangement is very simple and effective, various other control methods are not excluded from the scope of the present invention. For example, it is possible to arrange for the temperature or pressure sensor 792 to output a suitable signal to decision making circuitry and subsequently allow this circuitry to control the pump. That is to say, control the pump 791 via a suitable microprocessor program which takes other variables into account, by way of example.

It should be noted that the engine system to which the above disclosed intercooler is integrated, is not limited to that illustrated in FIG. 7 and may by way of example take the form of the arrangements disclosed in:

1. copending U.S. patent application Ser. No. 602,451 filed on April 20, 1984 in the name of Hayashi now U.S. Pat. No. 4,545,335;
2. European Patent Application No. 84112777.2 filed on Oct. 23, 1984 in he name of Nissan Motor Co. Ltd; and
3. European Patent Application No. 84114579.0 filed in Nov. 30, 1984 in the name of Nissan Motor Co. Ltd.

The disclosure contained in these documents is hereby incorporated by reference thereto.

What is claimed is:

1. In a supercharged internal combustion engine having
   a combustion chamber,
   a compressor, and
   an induction conduit leading from said compressor to said combustion chamber and through which supercharging air passes from said compressor to said combustion chamber,
   a cooling system comprising:
   a first coolant jacket formed about structure of said engine subject to high heat flux;
   a radiator in which coolant vapor is condensed to its liquid form;
   a first vapor transfer conduit leading from said first coolant jacket to said radiator;
   means for returning liquid coolant from said radiator to said first coolant jacket in a manner to maintain said structure subject to high heat flux immersed in liquid coolant and define a vapor collection space within said first coolant jacket;
   a second coolant jacket arranged with said induction conduit for cooling the air which passes through said induction conduit;
   a second vapor transfer conduit leading from said second coolant jacket to said radiator; and
   a first pump which pumps liquid coolant from said radiator to said second coolant jacket in response to a first parameter sensor which senses a parameter which varies with the supercharging of said engine.

2. A cooling system as claimed in claim 1, further comprising:
   a first overflow conduit leading from said second coolant jacket to said radiator for returning excess coolant which is pumped into said second coolant jacket by said first pump.

3. A cooling system as claimed in claim 1, wherein said liquid coolant returning means takes the form of:
   a first level sensor disposed in said coolant jacket at a level higher than said structure subject to high heat flux and lower than the uppermost portion of the said coolant jacket;

a second pump which pumps liquid coolant from said radiator in response to said first level sensor indicating that the level within said coolant jacket is lower than said level sensor, said second pump being disposed in a return conduit which leads from said radiator to said coolant jacket.

4. A cooling system as claimed in claim 1, further comprising:

a reservoir containing liquid coolant;

valve and conduit means for selectively establishing fluid communication between said coolant jacket and said reservoir;

first valve and conduit control means for conditioning said valve and conduit means so as to fill a cooling circuit which includes said first and second coolant jackets, said radiator and said first and second vapor transfer conduits, with liquid coolant from said reservoir when said engine is stopped;

second valve and conduit control means for conditioning said valve and conduit means so as to introduce excess coolant from said reservoir into said cooling circuit when the temperature of the coolant in said coolant jacket is below a first predetermined level and thus purge out any non-condensible matter in said cooling circuit; and third valve and conduit control means for conditioning said valve and conduit means so as to permit coolant to be displaced from said engine under the influence of the vapor pressure produced within said cooling circuit when the engine is running and the temperature of said coolant is above said first predetermined level, and for terminating the displacement when the amount of coolant contained in said cooling circuit has been reduced to a predetermined desired level.

5. A cooling system as claimed in claim 4, wherein said valve and conduit means includes:

a fill/discharge conduit which leads from said reservoir and communicates with a lower portion of said coolant jacket;

a first valve disposed in said fill/discharge conduit, said first valve having a first position wherein communication is permitted between said coolant jacket and said reservoir and a second position wherein communication between said coolant jacket and said reservoir is prevented;

a supply conduit which leads from said reservoir and which communicates with said return conduit at a location upstream of said second pump;

a second valve disposed at the junction of said supply conduit and said return conduit and which in a first state establishes communication between said pump and said radiator via said return conduit and which in second state establishes communication between said pump and said reservoir via said supply conduit;

an overflow conduit which leads from an upper section of the coolant jacket to said reservoir; and a third valve disposed in said overflow conduit, said third valve having a first normal position wherein communication between said coolant jacket and said reservoir is prevented and a second position wherein communication is established between said coolant jacket and said reservoir.

6. A cooling system as claimed in claim 4, wherein said valve and conduit means further includes:

a small collection tank formed at the bottom of said radiator; and a second level sensor disposed in said collection tank for sensing the level of coolant therein, said third valve and conduit control means being responsive to the output of said second sensor in manner that when the coolant level falls thereto, said third valve and conduit control means terminates the displacement of coolant out of said cooling circuit.

7. A cooling system as claimed in claim 1, further comprising:

a device associated with said radiator for varying the rate at which coolant vapor is condensed to liquid form in said radiator;

a second parameter sensor responsive to a parameter which varies with the temperature of the liquid coolant in said coolant jacket;

a third parameter sensor responsive to a parameter which varies with the load on the engine; and means responsive to said second and third parameter sensors for controlling said device in manner which tends to increase the temperature at which the coolant boils to a second predetermined temperature when the load on the engine is with a predetermined range and for controlling said device in a manner which tends to decrease the temperature at which the coolant boils to a third predetermined level when the load on said engine is outside said predetermined range.

8. A cooling system as claimed in claim 1, wherein said second coolant jacket comprises:

a housing structure including first passages through which supercharged air flows, and second passages into which coolant is introduced, said first overflow conduit being arranged to communicate with said housing at a level equal to or higher than the upper level of said first passages, said second vapor transfer conduit being arranged to communicate with said housing at a level higher than that at which said firs overflow conduit communicates with same.

9. A cooling system as claimed in claim 1, wherein said first parameter sensor is disposed in said induction conduit upstream of said second coolant jacket.

10. A cooling system as claimed in claim 1, wherein said first parameter sensor senses one of the temperature and pressure of the air discharged from said compressor.

* * * * *